Oct. 11, 1966     C. SCHIELE     3,278,366
STORAGE DEVICE
Filed April 30, 1962
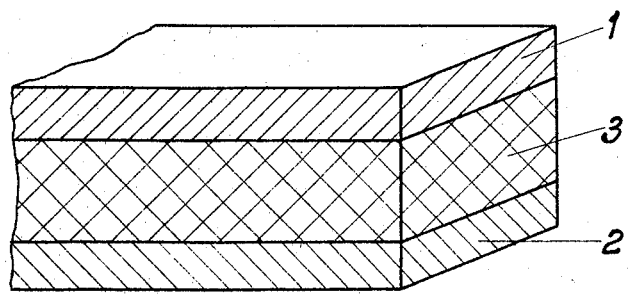
Inventor:
Cajetan Schiele
By: George L. Spencer
Attorney 3,278,366
STORAGE DEVICE
Cajetan Schiele, Ulm (Danube), Germany, assignor to Telefunken Patentverwertungs-G.m.b.H., Ulm (Danube), Germany
Filed Apr. 30, 1962, Ser. No. 191,110
Claims priority, application Germany, Apr. 28, 1961, T 20,077
8 Claims. (Cl. 161—227)

This invention relates to a storage device or film for storing high frequency electrical signals. More particularly, the invention concerns a storage device of the character described in the form of a multi-layered band.

In storage devices of the type with which the present invention is concerned, radiation is applied having at least an energy corresponding to a wave length of 200 m$\mu$ or less to produce a recording. In this way there can be recorded in accordance with known procedures, subject matter, which by the use of visible light would form with a commercial photographic emulsion only a latent image at first, which would have to be subjected to known reversing methods to produce a positive image. This process for the production of a latent image in a photographic emulsion can also be carried out with light of shorter wave lengths and higher energies.

There are also other known methods of image production, such as, for example, diazotype processes, which depend upon the principle of the transformation or decomposition of a stabilized diazonium salt, but these processes are also influenced by the energy of the impacting radiation and the energy density per unit of surface. In still another method of image production, leucocyanides of triphenylmethane dyes are subjected to the action of light of high energy, usually ultraviolet light. The impact of this energy produces a dissociation of the molecule, leading to the conversion to a quinonimine structure to form a colored image. A requisite for these processes of image formation is the use of an aqueous medium, since the accompanying color reactions will only take place in such a medium. This of necessity limits the field of usefulness of these methods, and indicates that it would be far better to operate under nonaqueous conditions, making use of solid state reactions.

It is accordingly an object of the present invention to provide a device for storing high frequency electrical signals which will avoid the use of aqueous media and which will be capable of convenient operation, in the solid condition, while at the same time offering a high quality image.

In accordance with the present invention, this and similar objects are achieved by employing as the storage layer a carrier or binding agent in which there is imbedded a tetrazolium salt, forming a redox system.

The redox system employing a tetrazolium salt, in accordance with the invention, is advantageously one in which excitation is responsive to radiation energy having a wave length less than about 200 m$\mu$. By irradiation with corresponding wave length radiation, the tetrazolium salts undergo transformation to the corresponding formazan compounds, together with a color change.

Tetrazolium salts which are especially suited for the purposes of the invention are those having the general formula:

$$R_1'-C\underset{N=N-R_1'''}{\overset{N-N-R_1''}{\diagup}}\quad \oplus \quad [Y]^{\ominus}$$

in which $R_1'$, $R_1''$ and $R_1'''$ are radicals selected from the group consisting of unsubstituted phenyl, unsubstituted naphthyl, halogenated phenyl, alkoxyphenyl, alkylphenyl, hydroxyphenyl, and diphenyl, and $[x]^{\ominus}$ is the residue of an inorganic or an organic acid.

Examples of halogenated phenyl radicals include: p-chlorophenyl, p-bromophenyl, 2,4-dichlorophenyl, 2,4,6-trichlorophenyl, and 3,4-dichlorophenyl.

Examples of hydroxyphenyl radicals include: p-hydroxyphenyl, o-hydroxyphenyl, 2-hydroxy-3,5-dibromophenyl.

Examples of alkoxyphenyl radicals include: p-methoxyphenyl, o-methoxyphenyl.

Examples of alkylphenyl radicals include: p-methylphenyl (p-tolyl); o-methylphenyl (o-tolyl).

Examples of inorganic acids include: hydrochloric acid, hydrobromic acid, hydroiodic acid, perchloric acid, sulfuric acid.

Examples of organic acids include: picric acid, acetic acid, propionic acid, phthalic acid.

Actual examples of tetrazolium salts having the above general formula and which may be suitably employed in producing the storage devices of the invention include:

2-[p-chlorophenyl]-3-phenyl-5-[p-chlorophenyl]-tetrazolium-iodide
2-[p-tolyl]-3-$\beta$-naphthyl-5-phenyl-tetrazolium-perchlorate
2-[3,5-dibromosalicyl]-3-[p-chlorophenyl]-5-phenyl tetrazolium-acetate
2-[3,4-dichlorophenyl]-3-phenyl-5-[p-chlorophenyl]-tetrazolium-acetate There may also be used in accordance with the invention, ditetrazolium salts having the general formula:

$$R_1'-C\underset{N=N}{\overset{N-N-R_1''}{\diagup}}\underset{\oplus \ [X]^{\ominus}}{-Z-}\underset{\oplus \ [X]^{\ominus}}{\overset{R_2''-N-N}{\diagup}}C-R_2'$$

in which $R_1'$, $R_1''$, $R_2'$, and $R_2''$, have the significance previously given, and Z is a member selected from the group consisting of phenylene, napthylene, biphneylene, diphenylsulfone, and o,o'-dimethoxybiphenylene, and $[x]^{\ominus}$ in the residue of an inorganic acid or an organic acid.

Actual examples of diteterazolium salts useful in practising the invention include:

2,2'-phenyl-3,3'-p-phenylene-5,5'-p-tolyl-dieterazolium-diperchlorate
2,2'-phneyl-3,3'-1,5-napthylene-5,5'-p-chlorophenyl ditetrazolium-diacetate.
2,2'-p-tolyl-3,3'-4,4'-p-diphenyl-sulfone-5,5'-p-tolyl-ditetrazolium-diiodide
2,2'-p-chlorophenyl-3,3'-4,4'-biphenylene-5,5'-p-chlorophenyl-dietetrazolium-diacetate.

In accordance with another aspect of the invention, it has been found advantageous to incorporate with the tetrazolium or ditetrazolium salt a reducing agent, such as, for example, a substituted or unsubstituted aromatic hydrazine, as for example phenyl hydrazine, or sym. diphenylhydrazine, or a member of the group of the Reductones, such as ascorbic acid. The choice of reducing agent is determined by energy of the radiation employed for image production, since in every case this must be sufficient to produce ionization of the tetrazolium salt which undergoes reduction to the formazan compound.

In the case of very energetic radiation having a wave length of less than 2 m$\mu$, the addition of a reducing agent can be dispensed with, for the reduction function can be assumed by the organic substance serving as a carrier for the tetrazolium salt, either wholly or partly. Where a reducing agent is used, it will be employed in an amount between about 2% and about 10% by weight of the tetrazolium salt.

The redox agent can be incorporated in a suitable carrier, which will be an organic substance, advantageously a plastic layer. The portion of tetrazolium salt, uniformly distributed throughout said layer will suitably be in the range of about 30% to about 60% by weight of the layer. The layer material to be practically useful should have first of all a moisture content below 4%, it should be substantially colorless, and should have a high degree of transparency. Examples of suitable layer or carrier materials include cellulose acetate, esspecially polyamides of the supronyl type, as produced by Kalle & Co., Wiesbaden.

In the accompanying drawing, there is illustrated a multi-layered storage device made in accordance with the invention. The figure shows in cross section a band or film consisting of three layers, laminated to each other successively by any suitable means. Layer 1 serves as an information storage device and consists of a layer of a plastic material, such as, for example, cellulose acetate or polyamide having a thickness of about 3 to 10μ, in which the redox system is incorporated. Layer 2 consists of a material possessing electrical conducting properties, preferably an organic material having good conductivity, for example, a polyamide. The conductivity of the layer can be increased by the addition of suitable inorganic or organic additives, such as, for example, stannous oxide, or quaternary amines. Between layers 1 and 2 there is interposed layer 3, in order to improve the mechanical properties of the assembly. Layer 3 consists of a solid carrier material, for example, a polyester resin, such as polyethylene terephthalate, and has a thickness of about 30 to 50μ.

The mode of operation of the multilayered storage device of the invention is that in order to record signals the device is subjected to exposure to radiation, with no subsequent developing being necessary. The changes produced in the storage layer by radiation are permanent and can be preserved for an indefinite period. The active material of the storage layer includes the tetrazolium salt which is colorless when not radiated, but when subjected to excitation energy in the form of radiation, becomes intensely colored. Thus there is obtained a transparent film which is colored at the places which have been subjected to radiation. The signals thus recorded can be read without any special equipment, any conventional film projector being sufficient for this purpose.

The manufacture of the multilayered storage device of the invention is illustrated by the following examples, which are not, however, to be regarded as limiting.

*Example 1*

99 mg. 1-p-chlorophenyl-3-phenyl - 5 - p - chlorophenyl tetrazolium-iodide are dissolved in 0.5 ml. anyhdrous methyl alcohol. To this solution 1 ml. of a previously prepared solution, containing 2000 mg. supronyl, 13,650 mg. paraformaldehyde, 13,815 mg. phenyl ethylene glycol and 21,030 mg. hexamethylenetetramine in 75 ml. chloroform, 225 ml. anhydrous methyl alcohol and 3 ml. diketene, is added. The clear yellowish transparent solution is spread to a thin homogeneous film on a smooth base and the dissolving media are evaporated. The film thus produced is a suitable storage layer according to the invention and sensible to a radiation of an energy corresponding to a wave length of 2 mμ or less. This film may be combined with a carrier layer and a conducting layer in known manner.

*Example 2*

77.2 mg. 2,2'-phenyl-3,3'-[4,4'-diphenylsulfon]-5,5'-p-tolyl ditetrazolium-diacetate are dissolved in 0.5 ml. anhydrous methyl alcohol. To this solution 1 ml. of a previously prepared solution, containing 2000 mg. supronyl, 13,650 mg. paraformaldehyde, 13,815 mg. phenyl ethylene glycol and 21,030 mg. hexamethylenetetramine in 75 ml. chloroform, 225 ml. anhydrous methyl alcohol and 3 ml. diketene, is added. The clear transparent solution is spread to a thin homogeneous film on a smooth base and the dissolving media are evaporated. The film thus produced is a suitable storage layer according to the invention and sensible to a radiation of an energy corresponding to a wave length of 2 mμ or less. This film may be combined with a carrier layer and a conducting layer in known manner.

What is claimed is:

1. A storage device for high frequency electrical signals comprising a multilayered band, at least one layer comprising a tetrazolium salt incorporated in a carrier therefor.

2. The device of claim 1 in which the tetrazolium salt has the general formula:

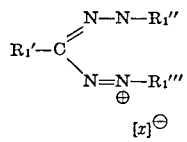

in which $R_1'$, $R_1''$, and $R_1'''$ are radicals selected from the group consisting of unsubstituted phenyl, unsubstituted naphthyl, halogenated phenyl, alkoxyphenyl, alkylphenyl, hydroxyphenyl, and diphenyl, and $[x]^\ominus$ is the residue of an acid selected from the group consisting of inorganic and organic acids.

3. The device of claim 1 in which the tetrazolium salt is a dietetrazolium salt having the general formula:

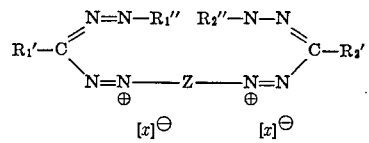

in which $R_1'$, $R_1''$, $R_2'$ and $R_2''$ are radicals selected from the group consisting of unsubstituted phenyl, unsubstituted naphthyl, halogenated phenyl, alkoxyphenyl, alkylphenyl, hydroxyphenyl, and diphenyl, Z is a member selected from the group consisting of phenylene, naphthylene, biphenylene, diphenylsulfone, and o,o'-dimethoxy-biphenylene, and $[x]^\ominus$ is the residue of an acid selected from the group consisting of inorganic and organic acids.

4. The device of claim 1 in which the tetrazolium salt layer includes from about 2% to about 10% by weight of the tetrazolium salt of a reducing agent for said tetrazolium salt.

5. The device of claim 1 in which the device is a three-layered band, one outer layer containing the tetrazolium salt, and the other outer layer comprising an organic plastic electrically conductive material.

6. The device of claim 5 in which the conducting layer is a polyamide.

7. The device of claim 1 in which the carrier for the tetrazolium salt is selected from the group consisting of cellulose acetate and a polyamide.

8. The device of claim 5 in which the intermediate layer is a polyester resin.

References Cited by the Examiner

Schreiber: Chemical Abstracts, vol. 43, p. 5313f, July 25, 1949.

EARL M. BERGERT, *Primary Examiner.*

L. T. PIRKEY, C. B. COSBY, *Examiners.*